United States Patent Office 3,763,242
Patented Oct. 2, 1973

3,763,242
METHOD OF MAKING POLYFUNCTIONAL
COMPOUNDS
Giuliana C. Tesoro, Dobbs Ferry, N.Y., assignor to
J. P. Stevens & Co., Inc., New York, N.Y.
No Drawing. Continuation-in-part of application Ser. No. 77,027, Dec. 20, 1960, which is a continuation-in-part of abandoned application Ser. No. 41,805, July 11, 1960. This application May 27, 1964, Ser. No. 370,663
Int. Cl. C07c 147/02
U.S. Cl. 260—607 A                    3 Claims

ABSTRACT OF THE DISCLOSURE

A process for reacting 2,2'-sulfonyldiethanol and n-butanol at an elevated temperature and in the presence of NaOH to produce bis(n-butoxy-ethyl) sulfone is disclosed.

---

The present invention relates to an improved method of making polyfunctional sulfone compounds, and more particularly, to a method of making bis(2-alkoxyethyl) sulfone compounds.

This application is a continuation-in-part of copending application Ser. No. 77,027, filed Dec. 20, 1960, which, in turn is a continuation-in-part of application Ser. No. 41,805, filed July 11, 1960, and now abandoned.

The polyfunctional sulfones obtained according to the method of the present invention are particularly suitable for processes for treating fiber forming and non-fiber forming polymers containing a plurality of hydroxyl groups per polymeric molecule, to form chemically modified polymers possessing valuable and highly desirable properties which render them useful in the textile and other arts.

Ipecifically, the bis(2-alkoxyethyl) sulfones are cross-linking agents for cellulosic textile materials and impart many desirable properties thereto. For example, the dimensional stability, water resistance and resilience of these textile materials are greatly improved by crosslinking with the aforementioned sulfones.

Heretofore, polyfunctional sulfone compounds and, in particular, bis(2-alkoxyethyl) sulfones have been prepared by elaborate and costly synthesis and this has represented a disadvantage and drawback in the use of these sulfones for commercial operations.

Accordingly, it is an object of the present invention to provide a novel method for making polyfunctional sulfone compounds that avoids the disadvantages and drawbacks of prior methods.

It is a further object of the present invention to provide a novel method for making bis(2-alkoxyethyl) sulfone compounds that avoids the costly and elaborate method employed heretofore.

Further objects of the present invention will become apparent from the detailed description thereof which follows.

The polyfunctional sulfones produced according to the methods of the present invention are ether compounds characterized by the presence of a beta-oxyethyl group and include beta-alkoxyethyl sulfones represented by the formula:

(I)            ROCH$_2$CH$_2$SO$_2$CH$_2$CH$_2$OR where R is a lower alkyl group, preferably having 1 to 4 carbon atoms.

According to the present invention, the ethers containing the grouping ROCH$_2$CH$_2$SO$_2$— can be prepared from the corresponding hydroxyethyl sulfone compounds by direct reaction with an alcohol in the presence of alkaline catalyst as illustrated below:

HOCH$_2$CH$_2$SO$_2$—+ROH→ROCH$_2$CH$_2$SO$_2$—+H$_2$O

This reaction, allowing the preparation of the ethers from two hydroxyl components, takes place even in the presence of a mild alkali such as the alkali carbonates and bicarbonates. This method for preparing organic ethers containing the grouping ROCH$_2$CH$_2$SO$_2$— is new and is believed to be important.

In carrying out the reaction between the hydroxyethyl sulfone and the alkanol, the amount of alkanol present can be up to about 10 moles per mole of the sulfone, although even higher amounts of the alkanol can be used if desired.

Included in the alcohols that can be employed for purposes of the present invention are methanol, ethanol, propanol, butanol, pentanol, and the like. Higher alcohols as well as branched chain alcohols can be employed, although these are generally more expensive than are the lower alcohols.

Among the alkaline catalysts that may be employed in the novel process for making the bis(2-alkoxyethyl) sulfones are the hydroxides, alkoxides, carbonates, and bicarbonates of alkali metals such as sodium and potassium. The reaction between the alkanol and the hydroxyethyl sulfone proceeds easily at elevated temperatures and reflux temperatures are generally preferred. By removal of the water of condensation as it is formed, the reaction can be accelerated. With lower boiling alcohols (1 to 3 carbon atoms) super-atmospheric pressure is preferable. With higher boiling alcohols, which are generally water insoluble, the reaction may be carried out above the boiling point of water, and the water of condensation removed as formed. Water is removed by azeotropic distillation.

The novel process in which the products are prepared directly from the beta hydroxyethyl sulfones by elimination of water or from other beta alkoxyethyl sulfones by elimination of volatile alcohol in the presence of alkaline catalyst are greatly advantageous.

The compounds produced according to the present invention are dialkyl ethers of bis-beta hydroxyethyl sulfone (HOCH$_2$CH$_2$SO$_2$CH$_2$CH$_2$OH)

which may also be referred to as 2,2'-sulfonyl diethanol. These dialkyl ethers can now be prepared in an economical manner by the process of this invention.

The invention can be further illustrated by the following example which is included for the purpose of illustration and is not intended to limit the scope of the invention. All of the bis(2-alkoxyethyl) sulfone compounds, including those defined above in Formula I can be prepared according to the preparative methods illustrated by the following example.

EXAMPLE I

A mixture of 154 grams (1 mol) of anhydrous bis beta hydroxyethyl sulfone, 741 grams (10 mol) of n-butanol, 200 grams of xylol and 100 grams of anhydrous potassium bicarbonate are refluxed with vigorous mechanical stirring while the water formed in the reaction is removed through a Dean-Stark moisture trap. The temperature of the reaction mixture when refluxing begins is about 112° C. and the temperature rises slowly to about 118° C. in the course of reaction. Refluxing is continued until the liberation of water is complete. This requires about 4–5 hours, and 33 grams (1.8 mols) of water are obtained. The reaction mixture is cooled to room temperature and filtered to remove the potassium bicarbonate catalyst which is recovered quantitatively. The filtrate is then stripped under reduced pressure, heating to about 120°–130° C. at 25 mm. to remove xylol and unreacted butanol. Some crystalline material forms in the residue on cooling. This is filtered off, and identified as p-oxathiane 4-4, dioxide:

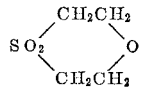

(M.P. 129° C.). The amount of this by-product is 34 grams, corresponding to about 25% of the bis-beta hydroxyethyl sulfone employed for the reaction. The filtrate obtained after removal of the cyclic compound consists mainly of the desired product, namely the dibutyl ether

This may be purified by vacuum distillation to give a clear colorless liquid boiling at 184°–189° C./9 mm.

What is claimed is:
1. A method for preparing bis(n-butoxyethyl) sulfone comprising reacting 1 mole of 2,2′-sulfonyldiethanol with 2 moles of n-butanol at an elevated temperature in the presence of NaOH.
2. A method as defined in claim 1 carried out under reflux.
3. A method as defined in claim 1 carried out while removing from the reaction mixture the water of condensation.

References Cited
UNITED STATES PATENTS
3,218,118  11/1965  Steele et al. _____ 260—607 X JOSEPH P. BRUST, Primary Examiner U.S. Cl. X.R.
260—327 P